United States Patent [19]

Matsuda et al.

[11] Patent Number: 5,615,068
[45] Date of Patent: Mar. 25, 1997

[54] HEAD LOCATING ACTUATOR HAVING REDUCED SUSCEPTIBILITY TO DYNAMIC REACTION FORCE EFFECTS, AND A DISK APPARATUS INCORPORATING THE SAME

[75] Inventors: Yasuhiro Matsuda; Shozo Saegusa; Takashi Yoshida, all of Ibaraki-ken; Marutomo Goto, Odawara; Shinobu Yoshida, Tsuchiura; Toshio Matsushita, Kanagawa-ken, all of Japan

[73] Assignee: Hitachi, Ltd., Tokyo, Japan

[21] Appl. No.: 507,970

[22] Filed: Jul. 27, 1995

[30] Foreign Application Priority Data

Aug. 1, 1994 [JP] Japan ............................... 6-179886

[51] Int. Cl.[6] ............................................... G11B 21/12
[52] U.S. Cl. ............................... 360/106; 360/97.01
[58] Field of Search ................................. 360/104–106, 360/97.01, 97.02

[56] References Cited

U.S. PATENT DOCUMENTS

| | | | |
|---|---|---|---|
| 4,965,684 | 10/1990 | Stefansky | 360/78.12 |
| 5,130,895 | 7/1992 | Somemiya et al. | 360/106 |
| 5,140,478 | 8/1992 | Yoshida | 360/97.01 |
| 5,375,021 | 12/1994 | Boeckner | 360/97.01 |
| 5,452,159 | 9/1995 | Stefansky | 360/105 |
| 5,453,891 | 9/1995 | Takemoto | 360/105 |
| 5,491,599 | 2/1996 | Sogabe | 360/104 X |

FOREIGN PATENT DOCUMENTS

| | | |
|---|---|---|
| 0427490A3 | 5/1991 | European Pat. Off. . |
| 4429900A1 | 3/1995 | Germany . |
| 2-193372 | 7/1990 | Japan . |
| 4-302869A | 10/1992 | Japan . |
| 5-174508 | 7/1993 | Japan . |
| 6-036252 | 2/1994 | Japan . |
| WO92/01283 | 1/1992 | WIPO ................. 360/106 |

*Primary Examiner*—John H. Wolff
*Attorney, Agent, or Firm*—Antonelli, Terry, Stout & Kraus, LLP

[57] ABSTRACT

A disk locating actuator of a disk apparatus has a carrier member carrying a head and a curved flexible printed circuit fixed at its one end to the carrier member and at its other end to a base. Angles at which the flexible printed circuit is fixed are suitably determined so as to diminish any dynamic reacting force produced by vibration of the flexible printed circuit, thus ensuring high degree of head locating precision.

14 Claims, 8 Drawing Sheets

HEAD LOCATING ACTUATOR HAVING REDUCED SUSCEPTIBILITY TO DYNAMIC REACTION FORCE EFFECTS, AND A DISK APPARATUS INCORPORATING THE SAME

BACKGROUND OF THE INVENTION

The present invention relates to an actuator for locating a head such as a magnetic head and also to a disk apparatus such as a storage apparatus using the head locating actuator.

In general, a disk apparatus of the kind mentioned above requires that a head is located, with a high degree of positional accuracy, between adjacent information tracks in the disk, in order to enable enhancement of storage capacity of the disk. To cope with such a demand, various measures have been taken such as rigidification of head carrying structure, provision of a damping mechanism and elimination of disturbance which might affect an actuator which serves as a head locating means.

Japanese Unexamination Patent Publication No. 4-302869 discloses a technique for reducing disturbance caused by a flexible printed circuit (abbreviated as "FPC", hereinafter) attached to the actuator. According to the disclosure, the disturbance is reduced by such an arrangement that FPC is disposed in such a position that the disturbance generated by the FPC, mostly a static reaction force produced by FPC, is substantially nullified when the magnetic head is located substantially midst between the radially outermost and innermost positions which the head takes during recording/reproduction.

The above-described arrangement is effective in diminishing the static reaction force which is generated by the FPC to act as disturbance, but cannot deal with any dynamic reaction force which may be applied to the head.

The actuator to which the FPC is connected moves at a high speed to the target information track position, so that an impact or dynamic force is applied to the FPC to cause it to vibrate. The vibration produces a dynamic reacting force which is transmitted to the actuator to hamper precise positioning of the head. The dynamic reacting force is of such a nature that it is generated even when there is no static reacting force. In order to achieve a high locating precision of the head, therefore, it is necessary to take a suitable measure for reducing dynamic reacting force.

SUMMARY OF THE INVENTION

Accordingly, an object of the present invention is to provide an actuator which can effectively diminish dynamic force of reaction so as to ensure a high degree of head locating precision.

To this end, according to one aspect of the present invention, there is provided a head locating actuator for locating a head with respect to a disk-type recording medium so as to enable said head to perform recording and/or reproduction of information in or from said recording medium, said head locating actuator comprising:

a carrier member carrying said head;

a supporting member supporting said carrier member;

an actuating power generating means for causing a movement of said carrier member so as to locate said head at a desired target position on said recording medium;

a base supporting said supporting member; and a flexible printed circuit having electrical signal lines leading to said head and said actuating power generating means, said flexible printed circuit being fixed at one end to said carrier member and at another end to said base and having a curved intermediate portion between said ends, wherein said flexible printed circuit is arranged such that the direction of a component of a dynamic reaction force generated as a result of vibration of said flexible printed circuit, which component is perpendicular to a direction of a line tangent to said flexible printed circuit at a point where said flexible printed circuit is fixed to said carrier member, is substantially perpendicular to a tangent to a direction of movement of said point caused by said actuating power generating means.

In the case where the actuating power generating means is of the type that causes pivotal movement of said carrier member so as to locate said head at a desired target position on said recording medium, said flexible printed circuit may preferably be arranged such that, setting an X-axis along a line interconnecting an origin set on the axis of a pivotal movement of said carrier member and the point at which said flexible printed circuit is fixed to said carrier member when said head is located substantially at a midst between the outermost and innermost peripheral edges of a recording surface of said recording medium, the angle formed, in a plane parallel to said recording surface and including said X-axis, between a longitudinal axis of said flexible printed circuit at said point and said X-axis is set to fall within a range of from 80 degrees to 100 degrees.

In an embodiment of the invention, said flexible printed circuit is arranged such that, determining said point as a first point, determining as a second point another point at which the other end of said flexible printed circuit is fixed, determining as a Y-axis a line which passes said origin and which is perpendicular to said X-axis, representing by r a distance between said origin and said first point, representing by (x+r, y) the coordinates of said second point in an X-Y coordinate plane, the absolute value of a ratio x/r is not less than 1 but not greater than 3 and the absolute value of a ratio y/r is not greater than 1.

In another embodiment of the invention, said flexible printed circuit is arranged such that, determining said point as a first point, determining as a second point another point at which the other end of said flexible printed circuit is fixed to said base, determining as a Y-axis a line which passes said origin and which is perpendicular to said X-axis, representing by $\theta_A$ the angle formed between said X-axis and said flexible printed circuit at said first point in the X-Y coordinate plane, and representing by $\theta_B$ the angle formed between said X-axis and said flexible printed circuit at said second point in the X-Y coordinate plane, the difference between the absolute values of said angles, expressed by $|\theta_A|-|\theta_B|$, is within a range of from −10 degrees to +10 degrees.

In a further embodiment of the invention, said flexible printed circuit is arranged such that, determining said point as a first point, determining as a second point another point at which the other end of said flexible printed circuit is fixed to said base, determining as a Y-axis a line which passes said origin and which is perpendicular to said X-axis, representing by r the distance between said origin and said first point, and representing by L the length of said curved intermediate portion of said flexible printed circuit between said first and second points in the X-Y coordinate plane, the value of a ratio L/r is not greater than 8.

The head locating actuator of the invention may further including a read/write IC for picking up head signals. The read/write IC may preferably be positioned between said first and second points.

The actuating power generating means of the head locating actuator according to the present invention may also be of the type that causes a linear movement of said carrier member so as to locate said head at a desired target position on said recording medium.

According to another aspect of the invention, there is provided a disk apparatus including the head locating actuator described above.

According to still another aspect of the invention, there is provided an information processing apparatus including the disk apparatus.

The head locating actuator of the present invention, by virtue of the features described above, can effectively diminish dynamic reacting force acting on a head, thus achieving a high degree of head locating precision. The disk apparatus of the invention incorporating such a head locating device can perform recording and/or reproduction with a high degree of precision.

These and other objects, features and advantages of the invention will become more apparent from the following description of preferred embodiments when the same is read in conjunction with the accompanying drawings.

DESCRIPTION OF THE PREFERRED EMBODIMENTS

Figure 1:
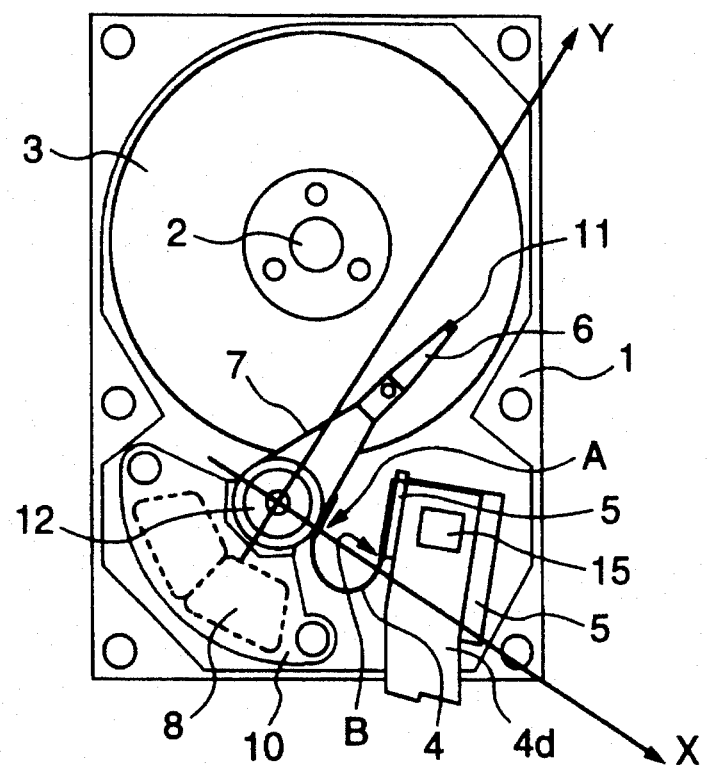
FIG. 1 is a plan view of a first embodiment of a magnetic disk apparatus which is a first embodiment of the present invention.

The basic concept or structure of the present invention, as well as definition of an X-Y coordinate plane, will be described with specific reference to FIGS. 1 to 3.

A spindle motor 2 operable at a predetermined rotation speed is fixed to a base 1. A magnetic disk 3 which serves as a recording medium is carried by the spindle motor 2. A supporting member 12 is rotatably carried by the base 1 and disposed at a position which is outside the outer peripheral edge of the magnetic disk 3 carried by the spindle motor 2. The supporting member 12 has an axis which extends in parallel with that of the spindle motor 2. A carriage 7, which carries a load arm 6 in support of the magnetic head 11, is fixed to the supporting member 12 so as to pivot about the axis of the supporting member 12.

The power for shifting the magnetic head 11 is generated by a voice coil motor. The voice coil motor has a coil 9 which is fixed to the carriage 7. The voice coil motor also has a magnetic circuit which includes a yoke 10 and a magnet 8 which is fixed to the yoke 10. A curved FPC 4 is fixed at its one end 4a to the carriage 7. The other end 4b of the FPC 4 is connected to the base 1 through an anchoring member 5. The curved FPC 4 is flexible so that it delicately changes its curvature, well responding to any vibratory motion of the carriage 7. The FPC 4 is connected, through another FPC 4d connected to the FPC anchoring member 5, to an external control circuit board (not shown) which includes driver circuits for the spindle motor 2 and the voice coil motor. The FPC 4d carries a read/write IC 15 to which is connected a head signal line leading from the magnetic head 11 through the FPC 4. The head signal line is electrically connected further to the aforesaid control circuit board through the FPC 4d. The read/write IC, however, may alternatively be carried by the FPC 4. The control circuit board is fixed to the lower side of the base 1. A cover (not shown) is fixed to the base 1 by means of, for example, screws or the like so as to define therebetween a sealed space which accommodates the magnetic disk 3 fixed to the spindle motor 2, as well as various parts including the carriage 7 supported by the supporting member 12, the load arm 6 fixed to the carriage 7, the magnetic head 11 held by the load arm 6, the magnetic circuit and the coil of the voice coil motor, head signal line leading from the magnetic head 11, and the FPC 4.

The direction of the electrical current supplied to the coil 9 fixed to the carriage 7, as well as duration of the current supply, are independently controllable so as to enable the direction and magnitude of the rocking torque acting on the carriage 7 to be controlled freely. It is therefore possible to locate the magnetic head 11 at any desired position on the magnetic disk 3, by the operation of the voice coil motor. The voice coil motor serving as the head locating actuator for locating the magnetic head 11 is thus composed mainly of the load arm 6, carriage 7, supporting member 12, coil 9, yoke 10, magnet 8 and the FPC 4.

According the present invention, the curved FPC 4 is fixed in a unique and novel manner at two points A and B on an X-Y coordinate plate shown in FIG. 1. Definition of these points A and B will be described with specific reference to FIG. 2.

The curved FPC 4 is fixed at its one end 4a to the carriage 7 and at its other end 4b to the FPC anchoring member 5 by bonding or by means of screws. The above-mentioned point A is defined as the boundary point between the curved portion 4c of the FPC 4 and the end 4a of the FPC 4 fixed to the carriage 7. The point A therefore will be referred to also as the "carriage-fixing position or point". Meanwhile, the point B is defined as the boundary point between the curved portion 4c and the end 4d of the FPC 4 fixed to the FPC anchoring member 5. The point B therefore will be referred to also as the base-side fixing position or point. The origin of the X-Y coordinate plane coincides with the axis O of the pivotal movement of the head locating actuator. A straight line which passes the origin O and the point A when the magnetic head 11 is located substantially midst between the innermost peripheral edge and the outermost peripheral edge of the magnetic disk 3 is assumed to be the X axis, while the Y-axis is set along a straight line which is perpendicular to the X-axis and which passes the origin O.

Figure 2:
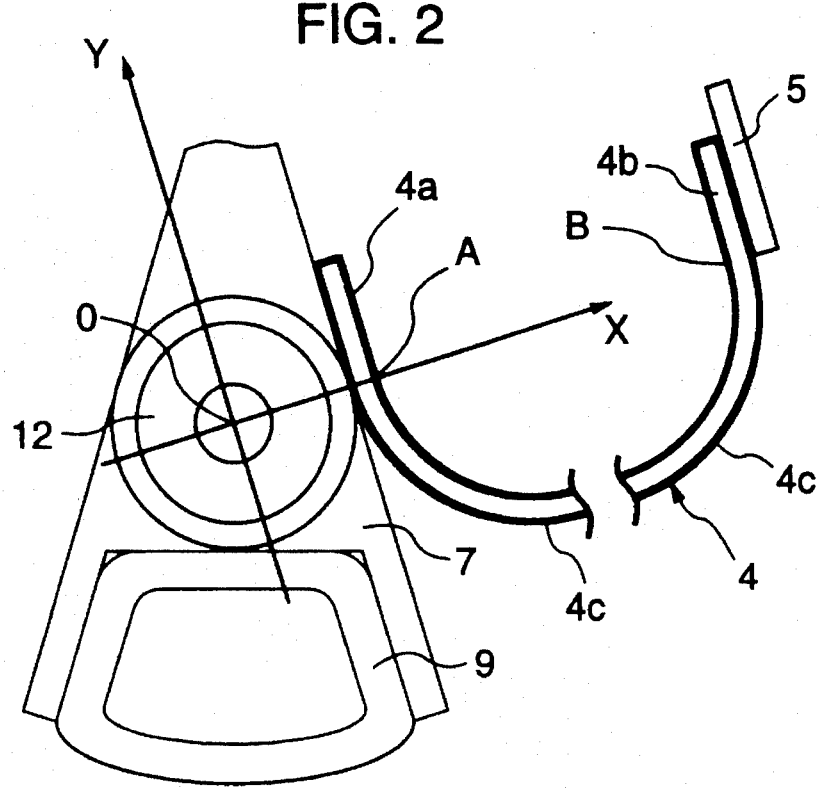
FIG. 2 is a plan view of a structure for connecting an FPC, illustrative of the definition of points A and B which are mentioned in the description of the embodiments.

In FIGS. 1 and 2, the curved portion 4c of the FPC is situated at the same side of the X-axis as the coil 9 of the actuator. This, however, is only illustrative and it will be apparent to those skilled in the art that the curved portion 4c may alternatively be positioned on the same side of the X-axis as the disk 3, with the aid of a spacer 16 sandwiched between two legs of a U-bend 4e, as shown in FIG. 3. In the arrangement shown in FIG. 3, electrical connection between the control circuit board and the FPC 4 is achieved through a connector 17.

Figure 4:
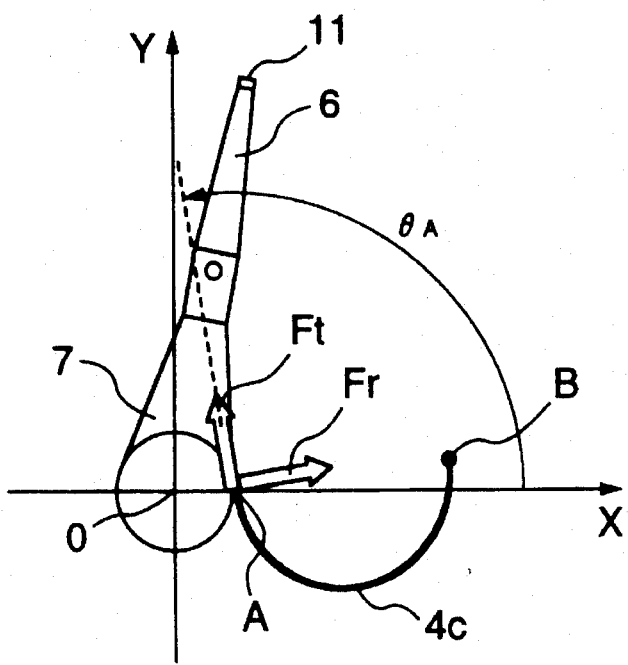
FIG. 4 is an illustration of an angle of action of a dynamic reacting force generated by an FPC in relation to the angle of the FPC at the point A in the first embodiment.
Figure 5:
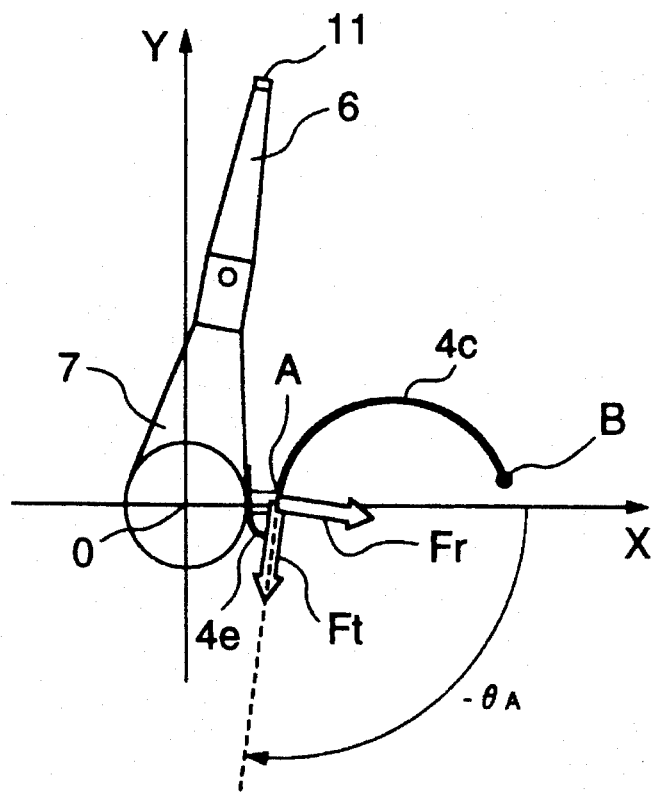
FIG. 5 is an illustration similar to FIG. 4, illustrative of an angle of action of the dynamic reacting force as observed in the modification shown in FIG. 3.

A first embodiment of the present invention will be described with reference to FIGS. 4 and 5. The first embodiment features that the angle $\theta_A$ of fixing of the FPC 4 at the carriage-side fixing point A is properly selected to achieve the object of the invention. The angle $\theta_A$ is the angle formed between the X-axis and a line which is tangent to the FPC 4 at the point A, as will be seen from FIGS. 4 and 5.

Figure 6:
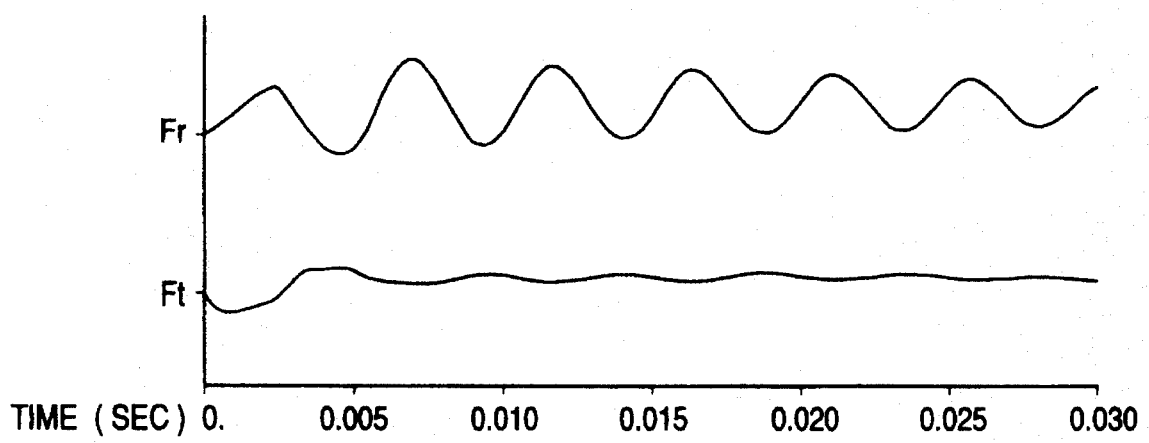
FIG. 6 is a graphical representation of the results of a calculation of the dynamic reacting force in the first embodiment.

As described before, the FPC tends to vibrate due to impacting force which is applied thereto as a result of a high-speed movement of the magnetic head 11 to the target position. Consequently, vibratory or dynamic reacting force is exerted by the FPC 4. This reacting force can be decomposed into two orthogonal components: namely, a reacting force component Ft acting in the direction tangent to the FPC 4 at the point A and a reacting force component Fr perpendicular to the component Ft. FIG. 6 shows the results of calculations conducted to determine the magnitudes of the force components Ft and Fr. It will be seen that the force component Fr is more dominant than the force component Ft. This means that the dynamic reacting force can effectively be reduced by decreasing the amplitude of the force component Fr or by arranging such that the force component Fr acts in a substantially radial direction of the axis of pivotal motion of the head locating actuator. In this embodiment, the absolute value of the angle $\theta_A$ of fixing the FPC 4 is selected to be 90° or thereabout so that the reacting force component Fr acts substantially in the radial direction of the axis of pivotal motion of the head locating actuator.

The angle $\theta_A$ may preferably range from 80 degrees to 100 degrees and, more preferably, from 85 degrees to 95 degrees. When the angle $\theta_A$ falls outside the range of from 80 degrees to 100 degrees, namely, when the angle $\theta_A$ is less than 80 degrees or greater than 100 degrees, the amplitude of the dynamic reacting force is more than two times the amplitude of the dynamic reacting force obtained when the angle $\theta_A$ is the optimum value (90 degrees). The amplitude of the dynamic reacting force obtained when the angle falls within the range of from 85 degrees to 95 degrees is smaller than 1.3 time the amplitude of the dynamic reacting force obtained when the angle $\theta_A$ is 90 degrees.

Figure 7:
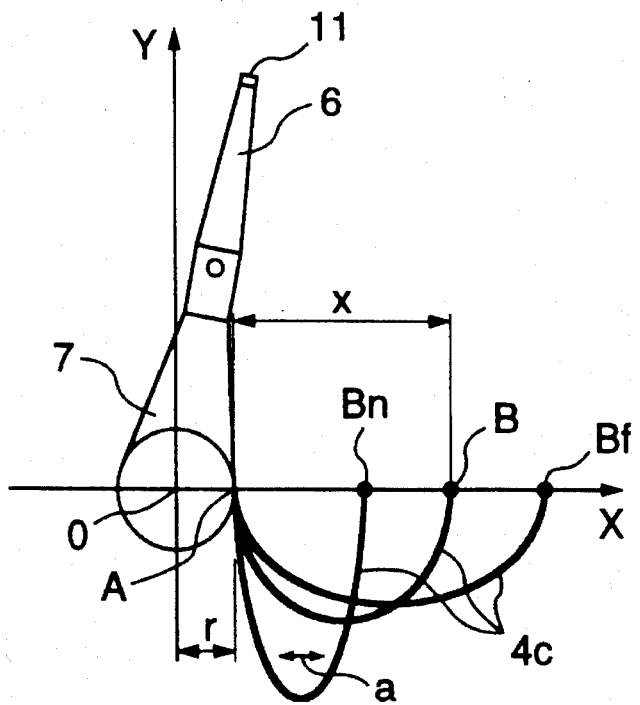
FIG. 7 is an illustration of the distance x between the points A and B along an X-axis in a disk apparatus which is a second embodiment of the present invention.
Figure 8:
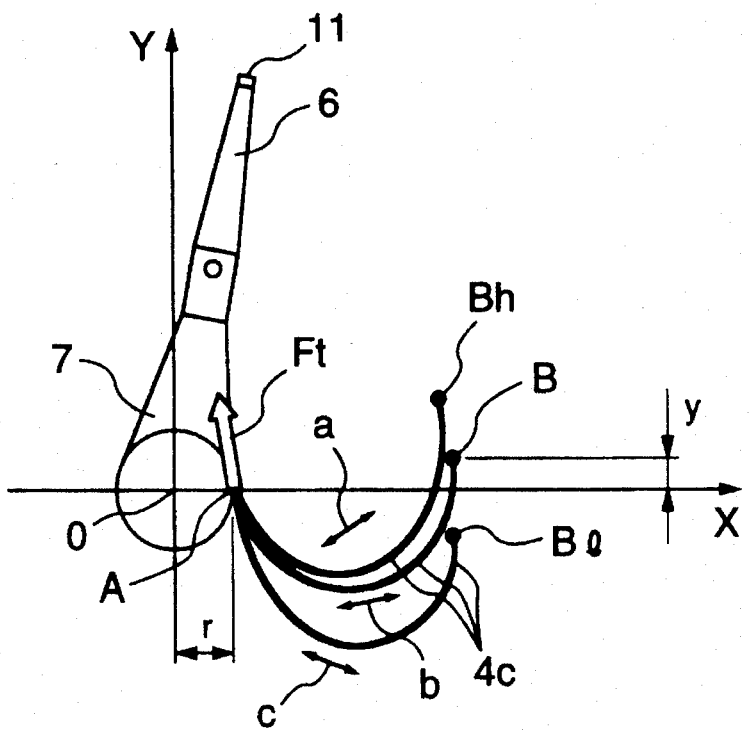
FIG. 8 is an illustration of the distance y between the points A and B along a Y-axis in the second embodiment.

FIGS. 7 and 8 show a second embodiment of the present invention which features that the base-side fixing point B of the FPC is properly positioned so as to achieve the object of the invention.

Referring to FIG. 7, the distance between the carriage-side fixing point A and the base-side fixing point B as measured along the X-axis is represented by x. When the base-side fixing point B is positioned at a position Bn which is closer to the carriage 7 than the point B is, the FPC 4 vibrates at a large amplitude in a direction indicated by an arrow a, thus generating a large magnitude of dynamic reacting force. Conversely, when the base-side fixing point B is positioned at a position Bf which is remoter from the carriage 7 than the point B is, the flexibility of the FPC 4 is reduced to hamper the delicate change in the configuration of the FPC 4, thus impairing the function of the FPC 4. It is therefore understood that a certain optimum value exists for the position of the base-side fixing point B in terms of the distance x between the fixing points A and B along the X-axis.

Referring now to FIG. 8, the distance between the carriage-side fixing point A (i.e., the X-axis) and the base-side fixing point B along the Y-axis is represented by y. In the case where the base-side fixing point B is located at the position Bh or Bl, the vibration appears in the direction of the arrow a or c which makes a greater angle with respect to the X-axis than the angle formed between the X-axis and the arrow b. The reacting force Ft is increased in accordance with the increase in the angle of the direction a or c with respect to the X axis. This means that an optimum value also exists for the position of the base-side fixing point B in terms of the distance y along the Y-axis.

In the second embodiment of the present invention, the dynamic reacting force is diminished by arranging such that, representing the distance between the carriage-side fixing point A and the origin O by r, the absolute value of the ratio x/r is not less than 1 but not greater than 3 and that the absolute value of the ratio y/r is not greater than 1. In the case where the ratio x/r and the ratio y/r are of values outside the ranges of the ratios specified above, the dynamic reaction force is increased to an amplitude which is substantially 1.5 times the dynamic reaction force obtained when the ratios are values optimized to minimize the dynamic reaction force. In the arrangement shown in FIGS. 7 and 8, the curved portion 4c of the FPC 4 is positioned at the same side of the X-axis as the coil 9 of the voice coil motor. The conditions described above, however, equally apply to cases where the curved portion 4c of the FPC is on the same side of the X-axis as the disk 3 as shown in FIG. 3.

Figure 9:
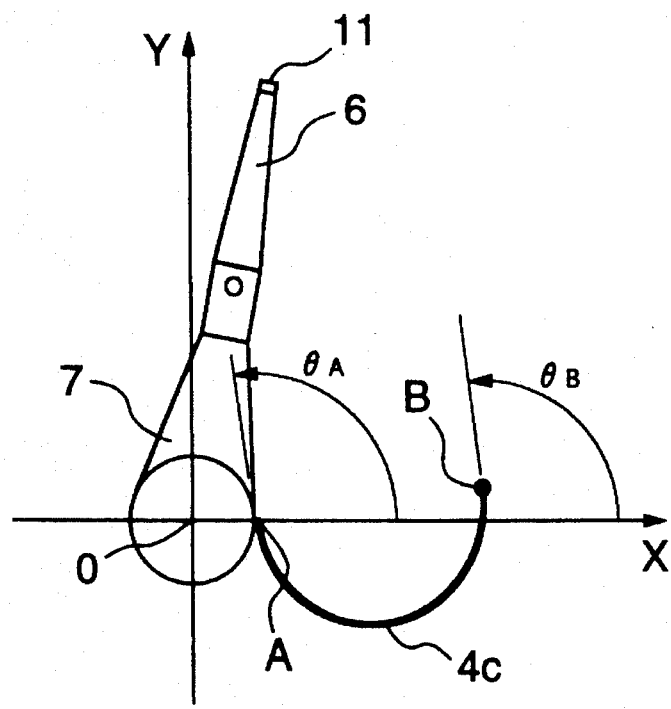
FIG. 9 is an illustration of an angle $\theta_B$ of an FPC at the point B in a disk apparatus which is a third embodiment of the present invention.
Figure 10:
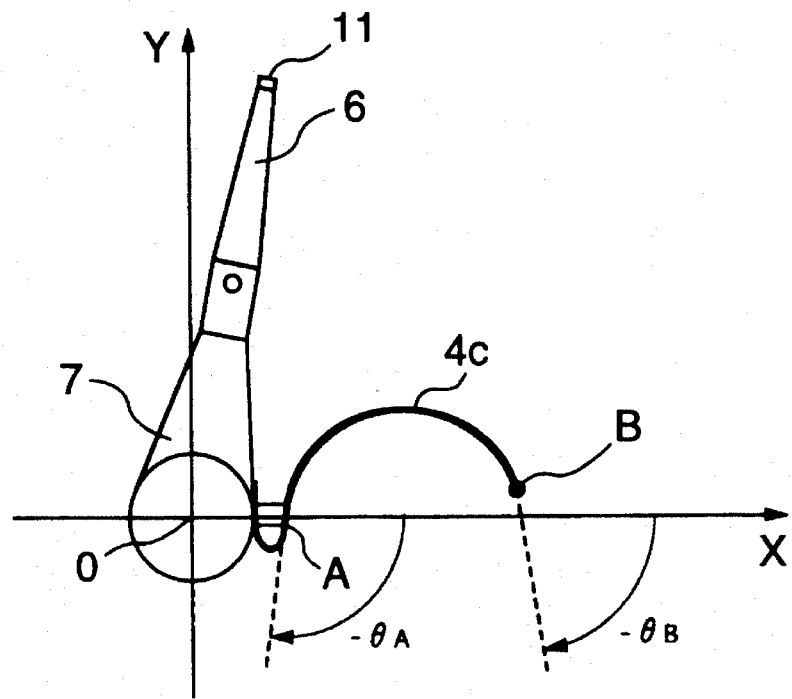
FIG. 10 is an illustration of a modification of the third embodiment.
Figure 11:
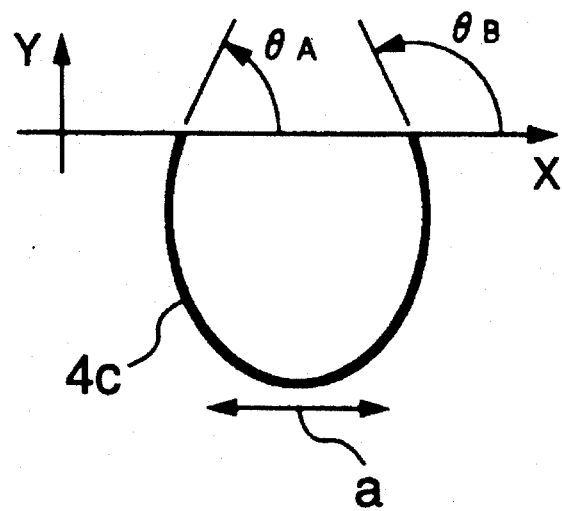
FIG. 11 is a plan view of the FPC in the third embodiment, as observed when the angle $\theta_B$ is large.
Figure 12:
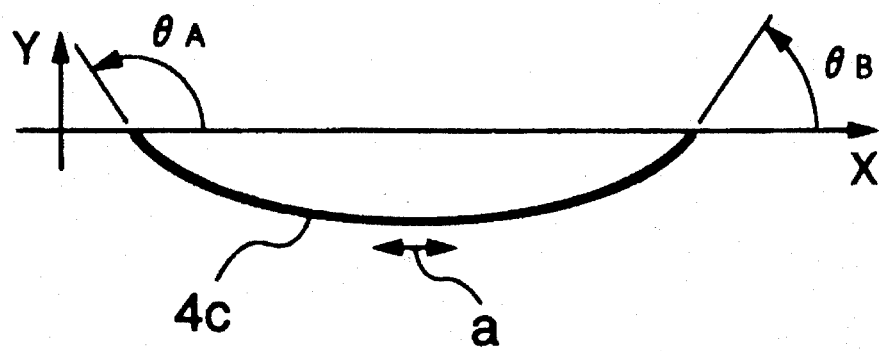
FIG. 12 is a plan view of the FPC in the third embodiment, as observed when the angle $\theta_B$ is small.

FIGS. 9 to 12 show a third embodiment of the present invention in which a suitable difference is set between the angle $\theta_A$ of fixing of the FPC 4 at the carriage-side fixing point A and the angle $\theta_B$ of fixing of the FPC 4 at the base-side fixing point B. The angle $\theta_B$ is determined here as the angle formed between the X-axis and a line which is tangent to the FPC 4 at the fixing point B, as shown in FIGS. 9 and 10. A curvature of the FPC 4 as shown in FIG. 11 apparently allows a greater amplitude of vibration to be generated in the direction of the arrow a than that caused by the curvature of the FPC 4 shown in FIG. 12. This means that the absolute value of the angle $\theta_B$ of fixing of the FPC 4 at the base-side fixing point B is substantially equal to or smaller than the absolute value of the angle $\theta_A$ of fixing of the FPC 4 at the carriage-side fixing point A. Thus, in the third embodiment of the present invention, dynamic reacting force produced by the FPC 4 is effectively diminished by determining the fixing angles $\theta_A$ and $\theta_B$ so as to meet such a condition that the difference $|\theta_A|-|\theta_B|$ is substantially zero. However, the difference between the absolute values of the angles $\theta_A$ and $\theta_B$ may range from $-10$ degrees to $+10$ degrees. In the case where the difference falls outside the specified range, the amplitude of the dynamic reaction force increases to a value which is greater than 1.2 times the value obtained from the optimum difference of angle. In addition, in the case where the difference is smaller than $-10$ degrees, the increase in the dynamic reaction force is greater than in the case where the difference is larger than $+10$ degrees.

Figure 3:
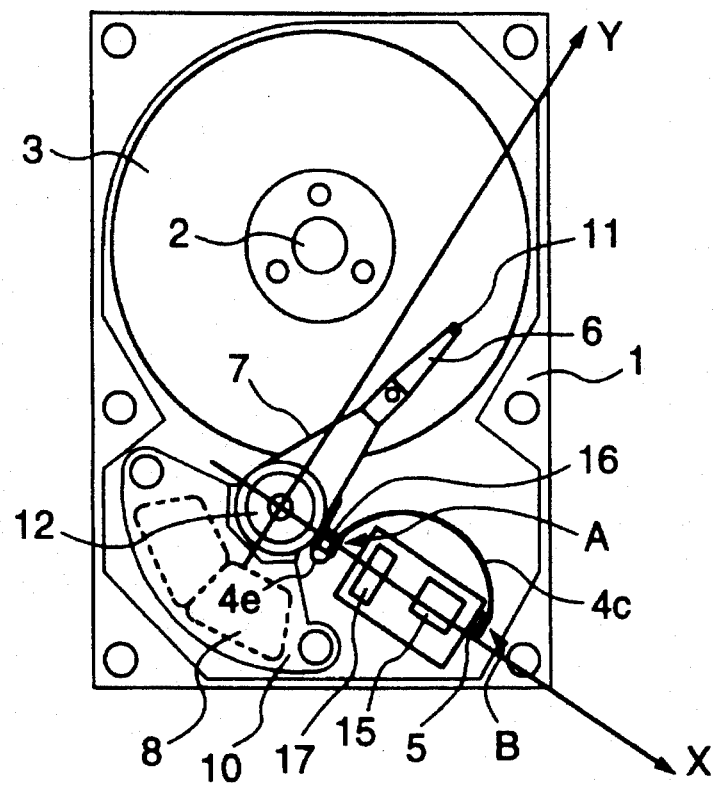
FIG. 3 is a plan view of a modification of the apparatus shown in FIG. 1.

In this embodiment, the curvature or loop of the FPC 4 is similar to that shown in FIG. 3, and the read/write IC 15 is located between the points A and B.

Figure 13:
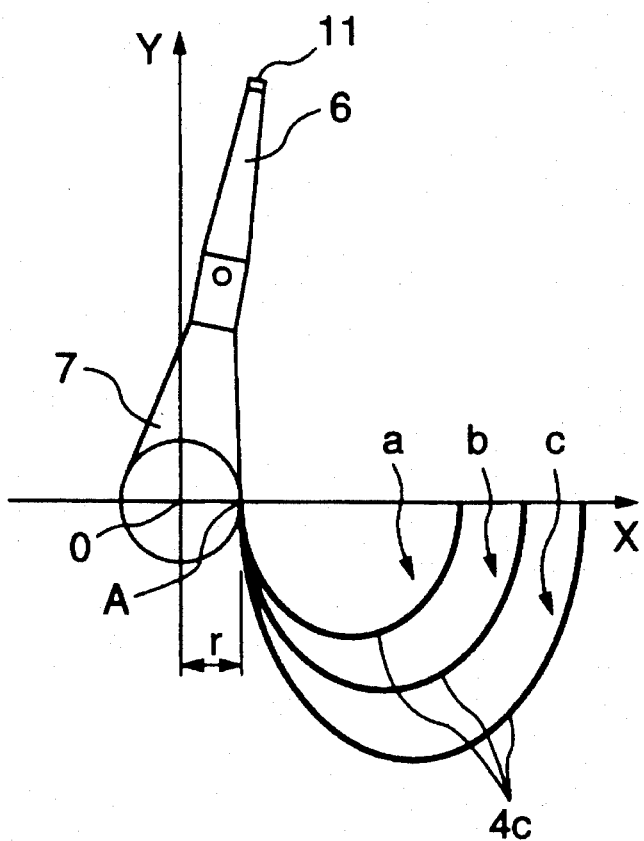
FIG. 13 is a schematic plan view of FPCs having different lengths, each being usable in a disk apparatus which is a fourth embodiment of the present invention.
Figure 14:
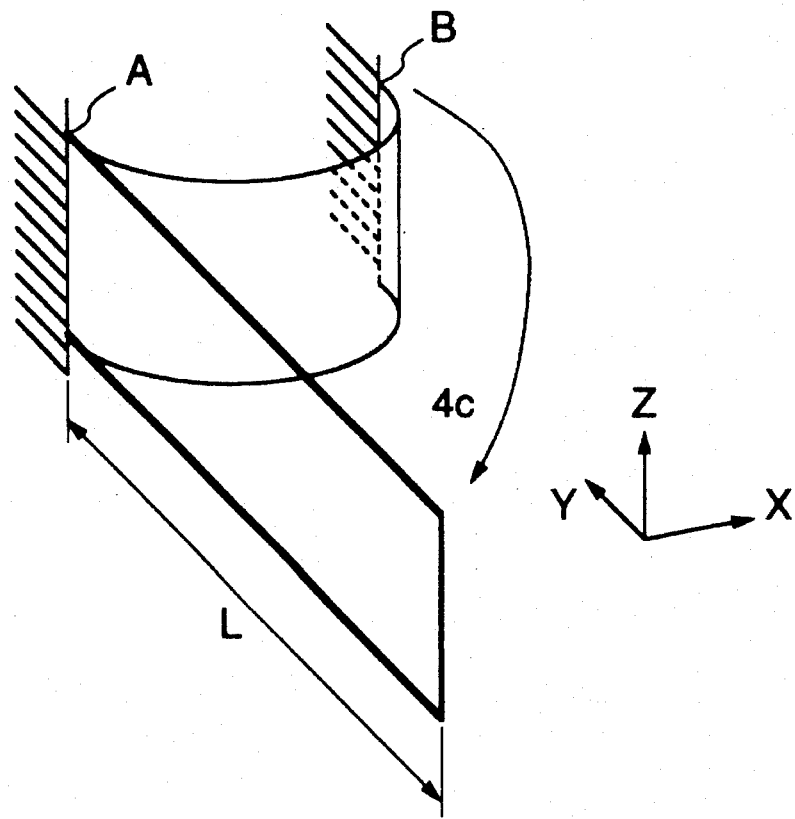
FIG. 14 is a schematic perspective view of an FPC used in the fourth embodiment, illustrative of the definition of the length L.

A fourth embodiment of the present invention will be described with reference to FIGS. 13 and 14. In this embodiment, the length L of the FPC 4 is properly selected so as to achieve the object of the present invention. The length L of the FPC 4 is defined as the length of the curved portion 4c of the FPC 4, i.e., the length of the portion of the FPC 4 between both fixing points A and B as measured along the curvature, as shown in FIG. 14. Referring to FIG. 13, the FPC indicated by b, as well as that indicated by c, has a greater length L of the curved portion 4c and, hence, smaller resonance frequencies than those of the FPC indicated by a. Consequently, the FPCs indicated by b and c tend to exhibit greater magnitude of vibration than the FPC indicated by a. This leads to the conclusion that a too large length L should be avoided in order to overcome the problem concerning the dynamic reacting force. In the fourth embodiment, therefore, the value of the ratio L/r, where r represents the distance of the carriage-side fixing point A from the origin O, is limited to be 8 or less, thereby diminishing the dynamic reacting force produced by the FPC 4. In the case where the value of the ratio L/r is larger than 8, the dynamic reacting force is increased to a value which is greater than 1.2 times the dynamic reacting force obtained from the ratio L/r optimized to minimize the dynamic reacting force.

It has been described that the reaction force is dependent on the angle $\theta_A$, on the ratios x/r and y/r, on the difference between the absolute values of the angles $\theta_A$ and $\theta_B$ and on the ratio L/r. Thus, the total reaction force amounts to the product of these values. The reaction force, however, is dynamic one and is smaller relative to the torque of the voice coil motor. It has been confirmed by the inventors that, in the described embodiments of the invention, increases in the angle $\theta_A$, the ratios x/r and y/r, the difference between the absolute value of the angles $\theta_A$ and $\theta_B$ and the ratio L/r to values equal to about 5 times the minimum values of these factors do not seriously affect the vibration of the carriage. Thus, the maximum values of the ranges of the numerical conditions employed by the inventors are determined to be less than 5 times the minimum values of the ranges.

The first to fourth embodiments described above can suitably and selectively be combined so as to produce multiplied effects.

Figure 15:
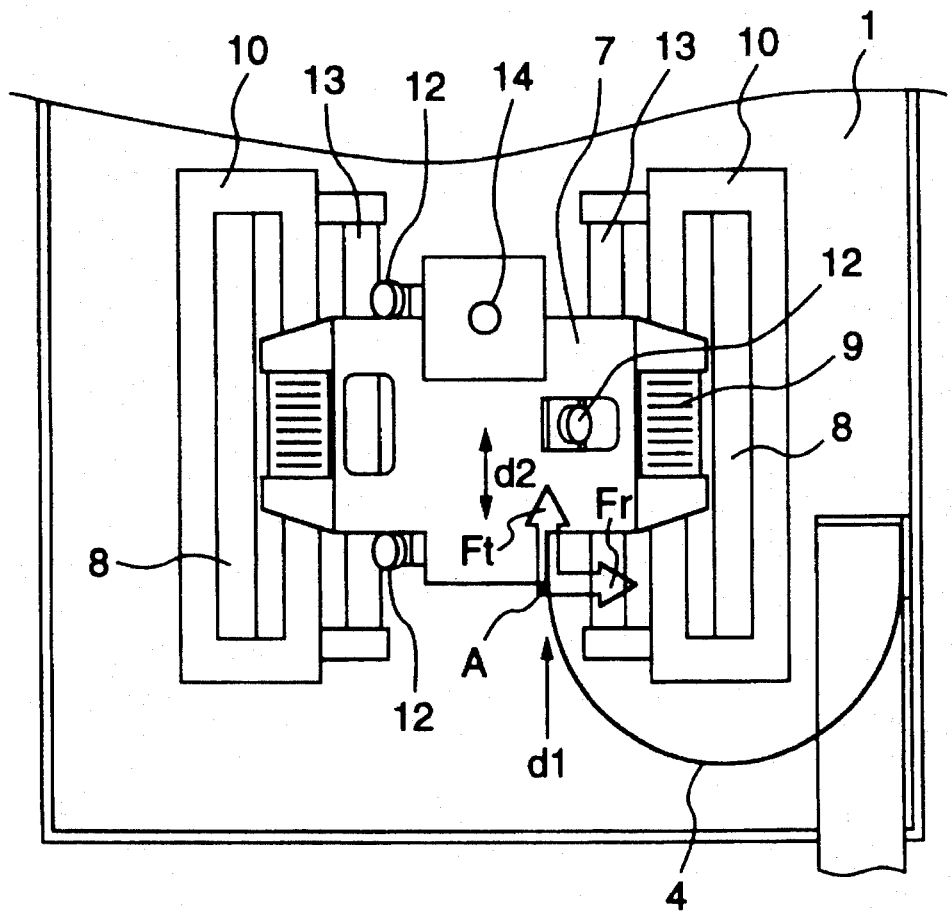
FIG. 15 is an illustration of the direction in which an FPC extends at the point A in a disk apparatus which is a fifth embodiment of the present invention.

FIG. 15 shows a fifth embodiment of the present invention which can suitably be realized in the form of an optical disk apparatus employing a head locating actuator which performs a linear locating operation to locate an optical head, wherein the directions of fixing of the ends of the FPC 4 are optimumly determined to achieve the object of the present invention. The optical head denoted by 14 is carried by a carriage 7 which in turn is supported for linear motion by a cooperation between rollers 12 and rails 13. The rails 13 are fixed to the base 1 directly or through the intermediary of a yoke 10 secured to the base 1. A voice coil motor which serves as the means for generating the actuating power includes a coil 9 fixed to the carriage 7, the above-mentioned yoke 10 and a magnet 8 fixed to the yoke 10. Although not shown in FIG. 15, the optical disk apparatus further includes various parts, such as means for driving a recording medium, optical system components, control circuits, a cover and so forth. An optical disk used as the recording medium is also omitted from FIG. 15.

In the fifth embodiment of the present invention, the FPC 4 is arranged in such a manner that the direction $d_1$ in which an end portion of the FPC 4 extends at the fixing point A substantially coincides with the direction $d_2$ of the travel performed by the carriage 7. In this embodiment of the invention also, the FPC 4 is arranged such that the direction of the component Fr of the dynamic reaction force generated as a result of vibration of the FPC 4 is perpendicular to the direction of a line tangent to the FPC 4 at the point A where the FPC 4 is fixed to the carriage 7 and is substantially perpendicular to the direction of movement of the point A caused by the linear movement of the carriage 7 when the optical head is located substantially at the midst between the outermost and innermost edges of the recording surface of the optical disk, thereby diminishing dynamic reacting force produced by the FPC 4 due to vibration thereof.

Each of the embodiments and modifications described hereinbefore effectively diminishes dynamic reacting force produced by vibrating FPC 4, thus realizing a high degree of precision of locating of head by the head locating actuator.

A problem also has been encountered that, in general, lighter head locating actuator, which well copes with demand for a higher speed of response of disk apparatus, tends to be more seriously affected by disturbance. Such a problem, however, can be overcome by the present invention which effectively reduces dynamic reacting force acting on the head locating actuator.

Figure 16:
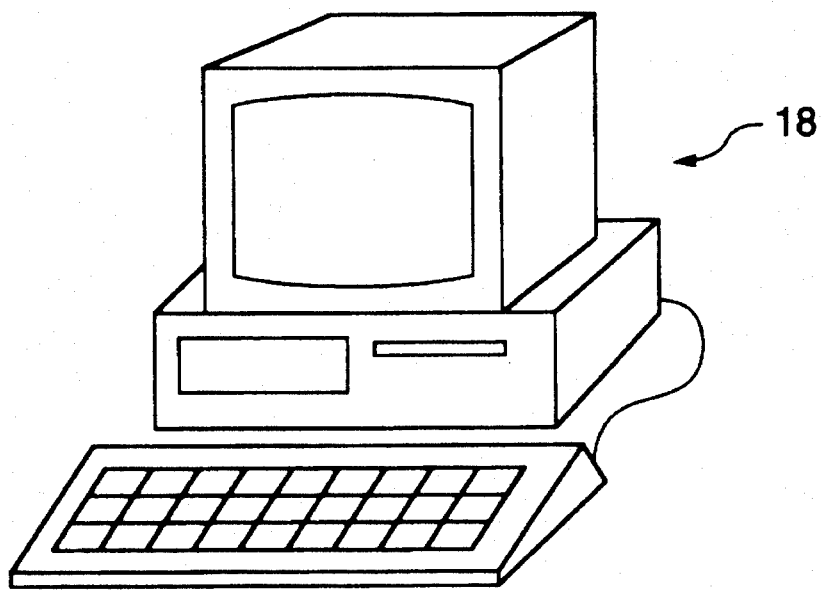
FIG. 16 is a perspective view of a personal computer incorporating an apparatus in accordance with the present invention.

FIG. 16 shows a sixth embodiment of the present invention which is a desk-top type personal computer incorporating magnetic disk apparatus or an optical disk apparatus in accordance with any one of the first to fifth embodiments. It will be understood that the personal computer of this embodiment can operate at a higher processing speed. Obviously, the same advantage can be enjoyed when the present invention is applied to other types of disk apparatuses such as a notebook-type personal computer, a work station and so forth.

As will be understood from the foregoing description, the present invention provides a head locating actuator which, through suppressing dynamic reacting force acting on the actuator, presents a high degree of head locating precision, by virtue of a novel feature in which the absolute value of the angle $\theta_A$ is set to be substantially equal to 90°. In different forms of the invention, the dynamic reacting force can be suppressed and diminished by various ways or features such as restriction of the absolute value of the ratio x/r to be not less than 1 but not greater than 3 and the ratio y/r to 1 or less, setting the difference $|\theta_A|-|\theta_B|$ between the absolute values of the angles $\theta_A$ and $\theta_B$ to be substantially zero or greater, and setting the value of the ratio L/r to be 8 or less. These features may be used independently to offer its peculiar effect or may suitably and selectively be combined to produce multiplied effects.

The present invention also effectively overcomes the problem which is caused by the use of a lighter disk locating actuator which meets the current demand for higher processing speed of disk apparatuses and which is more liable to be affected by disturbance.

Various disk apparatuses such as a personal computer, work station or the like, incorporating the disk locating actuator of the present invention, also can operate at higher processing speed.

What is claimed is:

1. A locating actuator comprising:

a head;

a recording medium onto which said head records information and from which said head reproduces information;

a carrier for oscillating said head;

a supporting member supporting said carrier;

driving means for causing movement of said carrier so as to locate said head at a desired target position on said recording medium;

a base supporting said supporting member; and a flexible printed circuit having electrical signal lines of at least a portion of said driving means and said head, said flexible printed circuit being fixed at one end to said carrier and at another end to said base and having a curved portion disposed between said one end and said another end, wherein said flexible printed circuit is arranged such that, in setting a coordinate system having an X-axis along a line interconnecting an origin of said coordinate system which is coincident with an axis about which pivotal movement of said carrier member takes place and a point at which said flexible printed circuit is fixed to said carrier member, when said head is located substantially at a midpoint between outermost and innermost peripheral edges of a recording surface of said recording medium, the angle formed, in a plane parallel to said recording surface and including said X-axis, between a longitudinal axis of said flexible printed circuit at said point and said X-axis is set to fall within a range of from 80 degrees to 100 degrees.

2. A head locating actuator according to claim 1, wherein said flexible printed circuit is arranged such that, determining said point as a first point, determining as a second point another point at which the other end of said flexible printed circuit is fixed, determining as a Y-axis a line which passes said origin and which is perpendicular to said X-axis, representing by r a distance between said origin and said first point, representing by (x+r, y) the coordinates of said second point in an X-Y coordinate plane, the absolute value of a ratio x/r is not less than 1 but not greater than 3 and the absolute value of a ratio y/r is not greater than 1.

3. A head locating actuator according to claim 2, wherein said flexible printed circuit is arranged such that, determining said point as a first point, determining as a second point another point at which the other end of said flexible printed circuit is fixed to said base, determining as a Y-axis a line which passes said origin and which is perpendicular to said X-axis, representing by $\theta_A$ the angle formed between said X-axis and said flexible printed circuit at said first point in the X-Y coordinate plane, and representing by $\theta_B$ the angle formed between said X-axis and said flexible printed circuit at said second point in the X-Y coordinate plane, the difference between the absolute values of said angles, expressed by $|\theta_A|-|\theta_B|$, is within a range of from −10 degrees to +10 degrees.

4. A head locating actuator according to claim 2, wherein said flexible printed circuit is arranged such that, determining said point as a first point, determining as a second point another point at which the other end of said flexible printed circuit is fixed to said base, determining as a Y-axis a line which passes said origin and which is perpendicular to said X-axis, representing by r the distance between said origin and said first point, and representing by L the length of said curved intermediate portion of said flexible printed circuit between said first and second points in the X-Y coordinate plane, the value of a ratio L/r is not greater than 8.

5. A head locating actuator according to claim 2, wherein said flexible printed circuit is arranged such that, determining said point as a first point, determining as a second point another point at which the other end of said flexible printed circuit is fixed to said base, determining as a Y-axis a line which passes said origin and which is perpendicular to said X-axis, representing by $\theta_A$ the angle formed between said X-axis and said flexible printed circuit at said first point in the X-Y coordinate plane, and representing by $\theta_B$ the angle formed between said X-axis and said flexible printed circuit at said second point in the X-Y coordinate plane, the difference between the absolute values of said angles, expressed by $|\theta_A|-|\theta_B|$, is within a range of from −10 degrees to +10 degrees, and wherein said flexible printed circuit is further arranged such that, determining as a Y-axis a line which passes said origin and which is perpendicular to said X-axis, representing by r the distance between said origin and said first point, and representing by L the length of said curved intermediate portion of said flexible printed circuit between said first and second points in the X-Y coordinate plane, the value of a ratio L/r is not greater than 8.

6. A head locating actuator according to claim 1, wherein said flexible printed circuit is arranged such that, determining said point as a first point, determining as a second point another point at which the other end of said flexible printed circuit is fixed to said base, determining as a Y-axis a line which passes said origin and which is perpendicular to said X-axis, representing by $\theta_A$ the angle formed between said X-axis and said flexible printed circuit at said first point in the X-Y coordinate plane, and representing by $\theta_B$ the angle formed between said X-axis and said flexible printed circuit at said second point in the X-Y coordinate plane, the difference between the absolute values of said angles, expressed by $|\theta_A|-|\theta_B|$, is within a range of from −10 degrees to +10 degrees.

7. A head locating actuator according to claim 6, wherein said flexible printed circuit is arranged such that, determining said point as a first point, determining as a second point another point at which the other end of said flexible printed circuit is fixed to said base, determining as a Y-axis a line which passes said origin and which is perpendicular to said X-axis, representing by r the distance between said origin and said first point, and representing by L the length of said curved intermediate portion of said flexible printed circuit between said first and second points in the X-Y coordinate plane, the value of a ratio L/r is not greater than 8.

8. A head locating actuator according to claim 1, wherein said flexible printed circuit is arranged such that, determining said point as a first point, determining as a second point another point at which the other end of said flexible printed circuit is fixed to said base, determining as a Y-axis a line which passes said origin and which is perpendicular to said X-axis, representing by r the distance between said origin and said first point, and representing by L the length of said curved intermediate portion of said flexible printed circuit between said first and second points in the X-Y coordinate plane, the value of a ratio L/r is not greater than 8.

9. A head locating actuator according to claim 1, further including a read/write IC for picking up head signals, said read/write IC being positioned between said point and another point at which said flexible printed circuit is fixed to said base.

10. A disk apparatus including the head locating actuator according to claim 1.

11. An information processing apparatus including the disk apparatus according to claim 10.

12. A locating actuator, comprising:

a head;

a recording medium on which said head records information and from which said head reproduces information;

a carrier for linearly moving said head;

a supporting member supporting said carrier;

driving means for causing a movement of said carrier so as to locate said head at a desired target position on said recording medium;

a base supporting said supporting member; and a flexible printed circuit fixed at one end to said carrier and at another end to said base and having a curved portion disposed between said one end and said another end, wherein said flexible printed circuit is arranged such that an angular difference formed between a longitudinal axis of said flexible printed circuit at a point which said flexible printed circuit is fixed to said carrier and a direction of movement of said carrier is set to fall within the range from −10 degrees to +10 degrees.

13. A disk apparatus including the locating actuator recited in claim 12.

14. An information processing apparatus including the disk apparatus recited in claim 13.

* * * * *